Sept. 23, 1930.  E. MANNING  1,776,363
FLUSH GATE AND DRIP VALVE
Filed Aug. 2, 1928  2 Sheets-Sheet 1
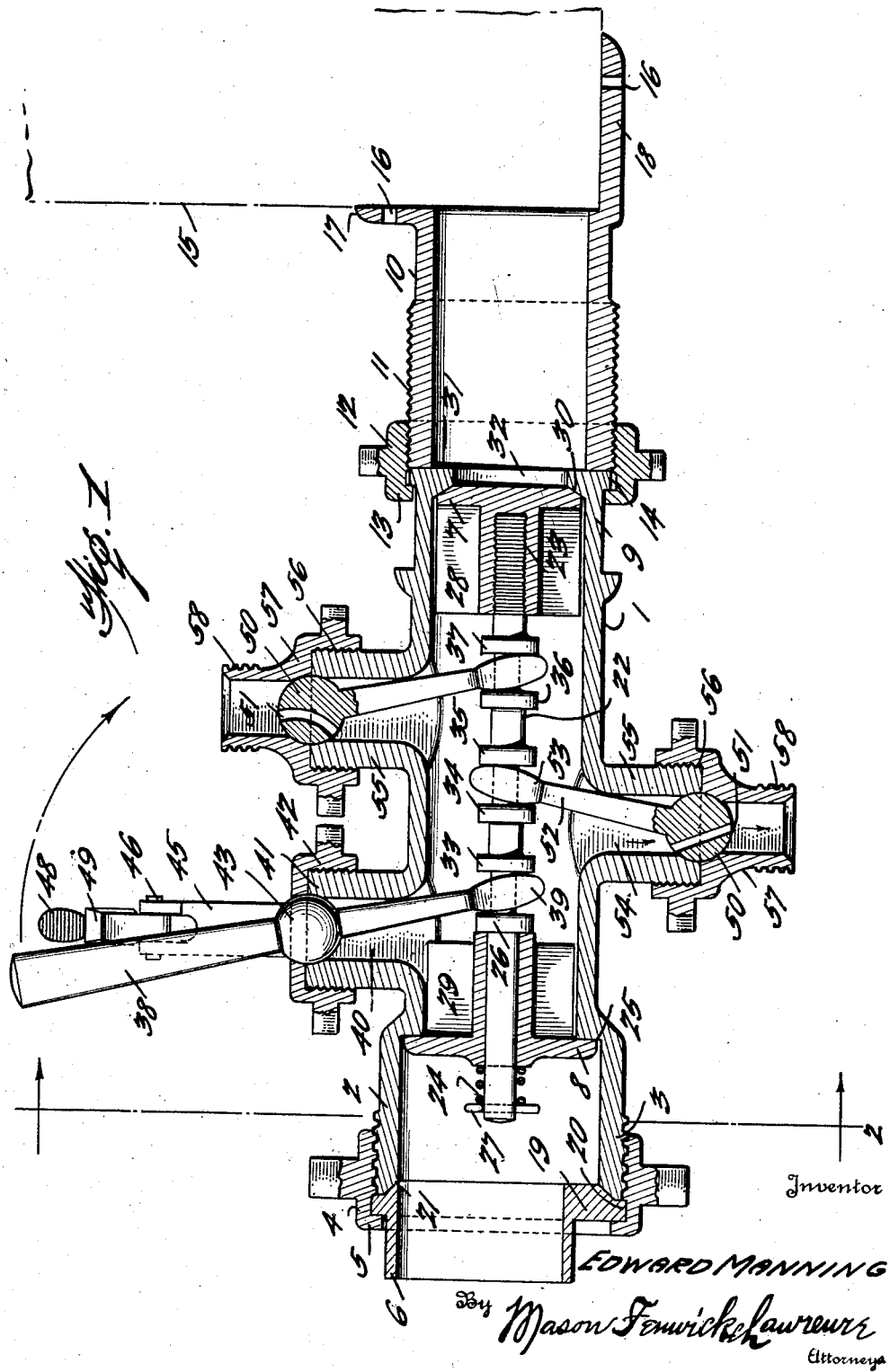
Inventor
EDWARD MANNING
By Mason Fenwick Lawrence
Attorneys

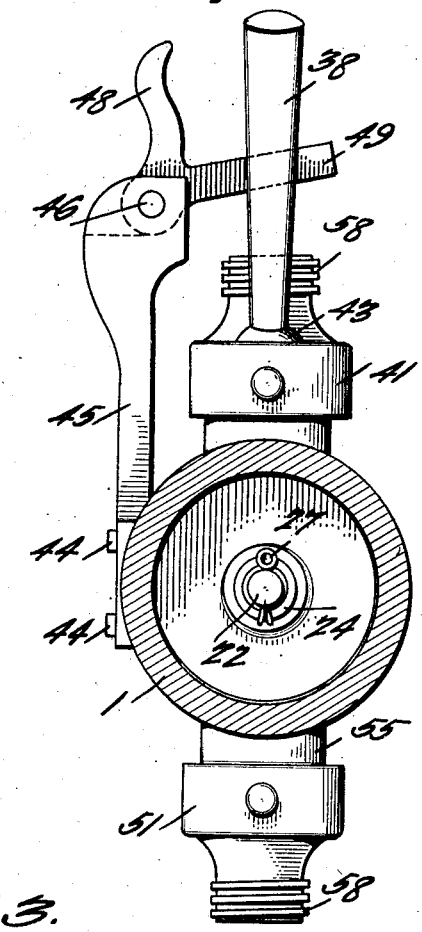
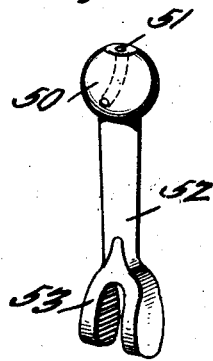
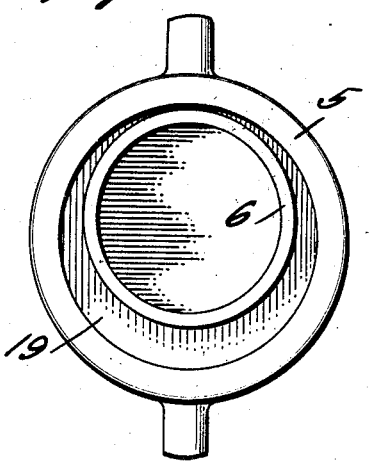

Patented Sept. 23, 1930

1,776,363

UNITED STATES PATENT OFFICE

EDWARD MANNING, OF RUTLAND, VERMONT, ASSIGNOR TO MANNING MANUFACTURING COMPANY, A CORPORATION OF VERMONT

FLUSH GATE AND DRIP VALVE

Application filed August 2, 1928. Serial No. 297,030.

This invention relates to improvements in flush gate and drip valves, particularly adapted for service in machines for the pasteurization of milk.

An object of this invention is to provide a flush gate valve combined with auxiliary drip valves in such a manner that when the flush gate valve is closed, the drip valves will be open, and during the process of opening the flush gate valve the drip valve or valves will function to close.

Another object of this invention is to provide a milk drip which will function to operate in conjunction with the main valve, it being understood that the main valve functions to close off the supply of milk from the pasteurizer, but it has been found from experience that a leakage occurs during the period of pasteurization, and this leakage or drip ordinarily flows into the pasteurized product, which is objectionable for many reasons, and the drip valve, according to this invention, provides an efficient means for eliminating the leakage problem.

Another object of this invention is to provide a flush gate valve having a plurality of valve members mounted upon the valve stem in such a manner that one of the members will function to eliminate the possibility of unpasteurized milk or other objectionable matter from flowing into the sanitary pipe line.

A further object of this invention is to provide a main valve having a stem and means connected with the stem for opening and closing the main valve, and an auxiliary valve mounted on the stem for closing off the sanitary pipe line when the main valve is closed, drip valves for eliminating leakage, and automatic means for opening the drip valves when closing the main valve, and closing the drip valves when opening the main valve, and means mounted on the valve housing for locking the valve in either open or closed position.

Another object of this invention is to provide a valve mechanism which may be readily connected to the pasteurizer without the forming of grooves or curves in the lining thereof.

Other objects of this invention will appear from the following detailed description of the device, and as disclosed in the two sheets of drawings, which are herewith made a part of this application.

In the drawings—

Figure 1 illustrates a sectional view of the flush gate and drip valve, disclosing the various members thereof in operative relationship to each other.

Figure 2 represents a sectional view of Figure 1, taken along line 2—2.

Figure 3 illustrates an end view of the flush gate valve adapted for receiving the sanitary pipe line.

Figure 4 represents a perspective view of the drip valve formed for cooperating with the main valve stem.

In the form of the invention herewith described and claimed, it is preferred that numeral 1 designate the main housing of the flush gate valve, made of any suitable material such as steel, and provided at the outer end with an enlarged portion 2, having a threaded section 3 for cooperating with the threaded portion of a coupling or closure element 4, formed with an inwardly extending flange 5 along the outer periphery for the purpose of holding in operative position a receiving nipple 6, adapted for attachment to a sanitary pipe line, through which the pasteurized milk may be delivered when the main valve member 7 and the auxiliary valve 8 are opened.

The inner end 9 of the housing 1 is adapted to be held firmly in open communication with a pipe section 10, one end of which is threaded, as at 11, for cooperating with a closure or coupling member 12, the outer edge of which is provided with an inwardly extending flange 13, which is adapted to be brought into clamped relationship with an outwardly extending flange 14 at the inner end of the housing 1, in such a manner that when tension is brought to bear upon the coupling member 12, the housing 1 and pipe member 11 may be brought into firm relationship and in open communication with each other, the opposite end of the pipe member 11 being in open communication with the pasteurizer 15, and fastened securely thereto by means of suitable fastening elements extending through openings 16 in the flange sections 17 and 18.

The nipple 6 for attachment to the sanitary pipe line is preferred in this invention to be formed having an outer periphery of a less diameter than the diameter of the enlarged portion 2 of the housing 1. In order to aid in the sanitary delivery of the milk, the inner flange 19 of the nipple 6 is formed having an outwardly extending shoulder portion 20 for cooperating with the inwardly extending flange 5 of the coupling 4, the edges of both the flange 19 and the portion 2 of the housing 1 being bevelled, as at 21, for the purpose of positive alignment when the nipple and the housing 1 are clamped together.

The flush gate valve in this invention is preferred to be formed having a stem 22, the main valve 7 being threadably mounted thereon at its inner end 23, while the valve member 8 is adapted to be slidably mounted on the outer end, as clearly disclosed in Figure 1, the outer end of the stem 22 extending a suitable distance beyond the valve 8 in order to loosely receive thereon a tension spring member 24 for the purpose of resiliently holding the valve member 8 in the seat portion 25 and against the collar section 26, which may be integrally formed from the stem member 22, or otherwise.

The spring element 24 is adapted to be held in operative relationship on the stem 22 by means of a pin 27 extending through the outer end thereof. The valve members 7 and 8 are provided with radially extending vanes 28 and 29. The valve member 7 is adapted to be provided with a bevelled outer edge 30 for cooperating with a similar surface on the valve seat portion 31, which extends inwardly in the form of a flange at the inner end of the housing 1, the opening 32 being of smaller diameter than the inner periphery of the pipe member 11.

At predetermined positions along the stem 22, lug or collar portions 26, 33, 34, 35, 36, and 37 are formed either integrally with the stem 22, or otherwise, as may be desired.

A control handle or lever 38, for opening and closing the main valve portion 7 and the valve member 8, is provided having at the inner end thereof a forked portion 39, properly constructed for embracing a section of the stem 22, located between the collar portions 26 and 33, the control lever 38 extending from the stem through a suitable opening 40 in the housing member 1, the opening 40 being bounded by an upwardly extending and threaded flange 41 for receiving a collar member 42 in threaded relationship thereof, the control handle 38 being provided with an enlarged spherical portion 43, which is adapted to be loosely supported by the upwardly extending flange 41 and held in operative position by means of the collar 42.

The control lever 38 and the forked portion thereof are arranged to cooperate with the stem 22 in such a manner that when the lever 38 is thrown in one direction the valves 7 and 8 are open, and when moved in the opposite direction the valves 7 and 8 will close.

In order to provide a suitable means for holding the valves 7 and 8 in firm open and closed position, it is preferred in this invention to securely fasten to the housing member 1 by means of bolts 44, an upwardly extending bracket element 45 having pivotally mounted therein, as at 46, a latch member 48 provided with a contact element 49 adapted to be raised and lowered into position for either locking or releasing the control lever 38.

In order to eliminate the leakage or drip problem which occurs in case of flush gate valves connected with pasteurizing apparatus, this invention provides a drip valve 50 operably arranged in connection with the housing 1 and the valve stem 22. Either a single drip valve or a plurality of drip valves 50 may be used without affecting the spirit of this invention.

The drip valve comprises a main body portion 50 of spherical formation, made of any suitable material, such as cast steel or the like, and provided with an opening 51. A stem portion 52 extends from the main section 50 and is provided at its inner end with a forked portion 53 adapted to embrace the stem 22 between the collar sections 34, 35, 36 and 37.

The stem 52 of the drip valve 50 extends through an opening 54, being bounded by an upwardly extending flange 55 having a threaded portion 56 for cooperating with a coupling member 57, the spherically shaped valve portion 50 being movably mounted and held firmly in operative position between the flange portions 55 and the coupling 57 when they are brought together under tension. The coupling 57 is furthermore provided with a threaded section 58 for the purpose of receiving a pipe line into which the leakage or drip may be delivered.

The valves 50 are so arranged in relationship to the movement of the valve members 7 and 8 that when the control lever 38 is moved in one direction for opening the valves 7 and 8, the drip valves and openings 51 will close, and the action in the opposite direction will be exactly the reverse.

In operation this invention provides a flush gate valve in combination with a sterilizing system. The valve portions within the main housing are so arranged that the danger of contaminating the sanitary pipe line is practically eliminated, there being a valve member at both the inner and outer ends of the valve stem, and the drip or leakage valves are located in connection with the housing between the two valve portions therein, in such a manner that the leakage or drip remaining in the housing after the valves are closed will be efficiently discharged.

Also, this invention provides a very efficient locking device for conveniently holding the valves in closed or open position, as may be desired.

It is to be understood that many changes and modifications may be made in the form or embodiment of this invention within the scope of the following claims without departing from the spirit of this invention.

What I claim is:

1. In a readily disassemblable valve mechanism, a casing forming a passage for liquid, a discharge valve closing the effluent portion of said casing, a stem for said discharge valve extending longitudinally within said casing, the latter being provided with a lateral spud, a drip valve seated in said spud, means for removably mounting said valve on its seat, said discharge valve stem having an abutment, an operating member for said drip valve removably engageable with said abutment and actuated by the movement of said valve stem to close said drip valve when said discharge valve is opened and a main operating member for actuating said discharge valve.

2. In a readily disassemblable valve mechanism, a casing forming a passage for liquid, a discharge valve closing the effluent portion of said casing, a stem for said discharge valve extending longitudinally within said casing, the latter being provided with a lateral spud, a drip valve seated in said spud, means for removably clamping said drip valve to its seat, spaced collars on said discharge valve stem, an operating member for said drip valve having a forked end embracing said discharge valve stem between said collars whereby said drip valve is operated by movement of said discharge valve stem, and a main operating member for opening and closing said discharge valve, said main operating member functioning also to place the discharge valve stem into position in which the operating member of said drip valve is properly alined for ready removal of said drip valve when said clamping means is removed.

3. In a readily disassemblable valve mechanism, a casing forming a passage for liquid, a discharge valve closing the effluent portion of said casing, a stem for said discharge valve extending longitudinally within said casing, said casing being provided at different levels with lateral spuds, drip valves seated in said spuds, means for removably clamping said drip valves to their seats, the stem of said discharge valve having pairs of spaced collars operatively related to the respective spuds, said drip valves being provided with operating members having forked ends embracing said discharge valve stems between the collars of the respective pairs of collars, and a main operating member for actuating said valve stem to simultaneously open said discharge valve and close said drip valves, said operating member being constructed to bring said discharge valve stem into such position that the operating members for said drip valves will properly align with the respective spuds to permit easy removal of said drip valves when said clamping means are removed.

4. In a readily disassemblable valve mechanism, a casing forming a passage for liquid, a discharge valve closing the effluent portion of said casing, a stem for said discharge valve extending longitudinally within said casing, said casing being provided at different levels with lateral spuds, drip valves seated in said spuds, means for removably clamping said drip valves to their seats, the stem of said discharge valve having pairs of spaced collars operatively related to the respective spuds, said drip valves being provided with operating members having forked ends embracing said discharge valve stems between the collars of the respective pairs of collars, and a main operating member for actuating said valve stem to simultaneously open said discharge valve and close said drip valves, said operating member being constructed to bring said discharge valve stem into such position that the operating members for said drip valves will properly align with the respective spuds to permit easy removal of said drip valves when said clamping means are removed, and said main operating member having a forked end engageable between spaced collars on said discharge valve stem whereby said main operating member may be readily disengaged from said discharge valve stem to permit ready removal of said valve and stem.

5. In a readily disassemblable valve mechanism, a casing forming a passage for liquid, a valve stem extending longitudinally within said casing, discharge valves at remote portions of said stem forming double closure for said casing and constituting the latter as a drip chamber for liquid leaking past the upper end of said discharge valves, said casing being provided with a lateral spud, a drip valve seated in said spud, said discharge valve stem being provided at intermediate points in its length with pairs of spaced collars, said drip valve having an operating member provided with a forked end adapted to removably engage said discharge valve between one pair of collars, and a main operating member for said valve stem having a forked end engaging said valve stem between a second pair of collars, removable clamping means for holding said drip valve to its seat, and other removable clamping means for retaining said operating means in position, said main operating means being arranged simultaneously to operate discharge valve and said drip valve, said main operating means being movable to a position in which it and the operating member for said drip valve are aligned in proper position for ready removal when said clamping means are removed.

In testimony whereof I affix my signature.

EDWARD MANNING.